United States Patent
Huang et al.

(10) Patent No.: US 10,637,071 B2
(45) Date of Patent: Apr. 28, 2020

(54) ELECTROCHEMICAL ENERGY CONVERSION DEVICE AND METHOD OF ELECTROCHEMICAL ENERGY CONVERSION

(71) Applicant: Industrial Technology Research Institute, Hsinchu (TW)

(72) Inventors: Chiu-Ping Huang, Taoyuan (TW); Li-Duan Tsai, Hsinchu (TW); Bing-Joe Hwang, Taipei (TW); Chun-Jern Pan, Pingtung County (TW); Hao-Sheng Cheng, Pingtung County (TW); Yu-Hsiang Mao, Tainan (TW); Meng-Che Tsai, Kaohsiung (TW); Jiunn-Nan Lin, Taoyuan (TW)

(73) Assignee: Industrial Technology Research Institute, Hsinchu (TW)

(*) Notice: Subject to any disclaimer, the term of this patent is extended or adjusted under 35 U.S.C. 154(b) by 62 days.

(21) Appl. No.: 15/390,741

(22) Filed: Dec. 27, 2016

(65) Prior Publication Data

US 2017/0187046 A1 Jun. 29, 2017

Related U.S. Application Data

(60) Provisional application No. 62/271,310, filed on Dec. 27, 2015, provisional application No. 62/383,609, filed on Sep. 6, 2016.

(30) Foreign Application Priority Data

Dec. 8, 2016 (TW) .............................. 105140556 A

(51) Int. Cl.
| | | |
|---|---|---|
| *H01M 4/92* | (2006.01) | |
| *H01M 4/88* | (2006.01) | |
| *H01M 8/083* | (2016.01) | |
| *C25B 1/00* | (2006.01) | |
| *C25B 1/04* | (2006.01) | |
| *C25B 11/04* | (2006.01) | |
| *G01N 27/30* | (2006.01) | |
| *B01J 23/89* | (2006.01) | |
| *B01J 35/00* | (2006.01) | |

(52) U.S. Cl.
CPC ............. *H01M 4/921* (2013.01); *C25B 1/003* (2013.01); *C25B 1/04* (2013.01); *C25B 11/04* (2013.01); *C25B 11/0494* (2013.01); *G01N 27/30* (2013.01); *H01M 4/8842* (2013.01); *H01M 4/925* (2013.01); *H01M 4/926* (2013.01); *H01M 8/083* (2013.01); *Y02E 60/366* (2013.01); *Y02P 20/134* (2015.11)

(58) Field of Classification Search
None
See application file for complete search history.

(56) References Cited

U.S. PATENT DOCUMENTS

| | | |
|---|---|---|
| 4,401,529 A | 8/1983 | Gray |
| 4,419,208 A | 12/1983 | Gray |
| 4,425,203 A | 1/1984 | Gray |
| 4,430,186 A | 2/1984 | Gray |
| 4,450,056 A | 5/1984 | Gray |
| 4,466,868 A | 8/1984 | Gray |
| 7,473,667 B2 | 1/2009 | Hagemeyer et al. |
| 2006/0105226 A1 | 5/2006 | Kim et al. |
| 2006/0292067 A1 | 12/2006 | Zhang et al. |
| 2006/0293173 A1 | 12/2006 | Zhang et al. |
| 2013/0295485 A1 | 11/2013 | Gottesfeld et al. |
| 2014/0370421 A1 | 12/2014 | Strmcnik et al. |

FOREIGN PATENT DOCUMENTS

| | | |
|---|---|---|
| CA | 2872633 | 12/2013 |
| CN | 101162651 | 6/2010 |
| CN | 104022289 | 9/2014 |
| CN | 104022293 | 9/2014 |
| CN | 104285323 | 1/2015 |
| CN | 105247720 | 1/2016 |
| EP | 1899264 | 3/2008 |
| EP | 2847814 | 3/2015 |
| IN | 2708KON2014 | 5/2015 |
| JP | H0935723 | 2/1997 |
| JP | 2001256982 | 9/2001 |
| JP | 2006120407 | 5/2006 |
| JP | 2008506513 | 3/2008 |
| JP | 2008546533 | 12/2008 |

(Continued)

OTHER PUBLICATIONS

Demirci et al ("Ru-based bimetallic alloys for hydrogen generation by hydrolysis of sodium tetrahydroborate", Journal of Alloys and Compounds (2008), vol. 463(1-2), p. 107-111) (Year: 2008).*

(Continued)

*Primary Examiner* — Sin J Lee
(74) *Attorney, Agent, or Firm* — JCIPRNET

(57) ABSTRACT

A catalyst composition and a use thereof are provided. The catalyst composition includes a support and at least one $Ru_xM_y$ alloy attached to the surface of the support, wherein M is a transition metal and X≥Y. The catalyst composition is used in an alkaline electrochemical energy conversion reaction, and can improve the energy conversion efficiency for an electrochemical energy conversion device and significantly reduce material costs.

5 Claims, 8 Drawing Sheets

(56) References Cited

FOREIGN PATENT DOCUMENTS

| JP | 2013518366 | 5/2013 |
|---|---|---|
| JP | 2015521346 | 7/2015 |
| KR | 20080034143 | 4/2008 |
| TW | 544968 | 8/2003 |
| TW | I301001 | 9/2008 |
| WO | 2007002357 | 1/2007 |
| WO | 2008082491 | 7/2008 |
| WO | 2013184269 | 12/2013 |

OTHER PUBLICATIONS

Paunovic et al ("Non-platinum electrode materials for hydrogen evolution: effect of catalyst support and metallic phase", Bulgarian Chemical Communications (2011), vol. 43(1), p. 74-80) (Year: 2011).*
"Office Action of Taiwan Counterpart Application," dated May 12, 2017, p. 1-p. 6, in which the listed references were cited.
"Office Action of Taiwan Counterpart Application," dated Dec. 28, 2017, p. 1-p. 5, in which the listed reference as cited.
Safizadeh et al., "Electrocatalysis developments for hydrogen evolution reaction in alkaline solutions e A Review", International Journal of Hydrogen Energy 40(2015), Jan. 5, 2015, pp. 256-274.
Bates et al., "Composite Ni/NiO—Cr2O3 Catalyst for Alkaline Hydrogen Evolution Reaction", The Journal of Physical Chemistry C, Feb. 2015, pp. 5467-5477.
Ma et al., "A Superlattice of Alternately Stacked Ni—Fe Hydroxide Nanosheets and Graphene for Efficient Splitting of Water", ACS NANO, Jan. 2015, pp. 1977-1984.
Gong et al., "Nanoscale nickel oxide/nickel heterostructures for active hydrogen evolution electrocatalysis", Nature communications, Aug. 22, 2014, pp. 1-6.
Sheng et al., "Correlating the hydrogen evolution reaction activity in alkaline electrolytes with the hydrogen binding energy on monometallic surfaces", Energy & Environmental Science, Apr. 2, 2013, pp. 1509-1512.
A.Yu.Tsivadze et al., "Prospects of Low-Temperature Platinum-free Fuel Cells",Russian Journal of General Chmistry, vol. 77, No. 4, Apr. 1, 2007, pp. 783-789.
M.R.Tarasevich et al.,"Kinetics of ethanol electrooxidation at RuNi catalysts", Electrochemistry Communications, vol. 1, Issue 2, Feb. 1, 2005, pp. 141-146.
A.D.Modestov et al.,"MEA for alkaline direct ethanol fuel cell with alkali doped PBI membrane and non-platinum electrodes", Journal of Power Sources,vol. 188, Issue 2, Mar. 15, 2009 pp. 502-506.
Giovanni P. Rachiero et al.,"Bimetallic RuCo and RuCu catalysts supported on γ-Al2O3. A comparative study of their activity in hydrolysis of ammonia-borane", International Journal of Hydrogen Energy, vol. 36, No. 12, Jun. 1, 2011, pp. 7051-7065.
"Search Report of European Counterpart Application," dated May 8, 2017, p. 1-p. 9, in which the listed references were cited.
Office Action of China Counterpart Application, dated Dec. 4, 2018, pp. 1-8.
A. Yu. Tsivadze et al., "Prospects of Low-Temperature Platinum-free Fuel Cells," Russian Journal of General Chemistry, vol. 77, Issue 4, Apr. 30, 2007, pp. 783-789.
A.D. Modestova et al., "MEA for alkaline direct ethanol fuel cell with alkali doped PBI membrane and non-platinum electrodes," Journal of Power Sources, vol. 188, Issue 2, Mar. 15, 2009, pp. 502-506.
Giovanni P. et al., "Bimetallic RuCo and RuCu catalysts supported on γ-Al2O3. A comparative study of their activity in hydrolysis of ammonia-borane," International Journal of Hydrogen Energy, vol. 36, Issue 12, Jun. 30, 2011, pp. 7051-7065.
M.R. Tarasevich et al., "Kinetics of ethanol electrooxidation at RuNi catalysts", Electrochemistry Communications, vol. 7, Issue 2, Feb. 2005, pp. 141-146.
Liang Ma et al.,"PdRu/C catalysts for ethanol oxidation in anion-exchange membrane direct ethanol fuel cells", Journal of Power Sources, vol. 241, Nov. 1, 2013, pp. 696-702.
Bing Joe Hwang et al.,"Probing the Formation Mechanism and Chemical States of Carbon-Supported Pt—Ru Nanoparticles by in Situ X-ray Absorption Spectroscopy", J. Phys. Chem. B, vol. 110, No. 13, Mar. 16, 2006, pp. 6475-6482.
P.W.T.Lu et al.,"Nickel Based Alloys as Electrocatalysts for Oxygen Evolution from Alkaline Solutions", Journal of The Electrochemical Society: Electrochemical Science and Technology, Feb. 1978, pp. 265-270.
"Office Action of Japan Counterpart Application," dated Jan. 9, 2018, p. 1-p. 6, in which the listed references were cited.

* cited by examiner

ELECTROCHEMICAL ENERGY CONVERSION DEVICE AND METHOD OF ELECTROCHEMICAL ENERGY CONVERSION

CROSS-REFERENCE TO RELATED APPLICATION

This application claims the priority benefit of U.S. Provisional Patent application 62/271,310 filed Dec. 27, 2015, U.S. Provisional Patent application 62/383,609 filed Sep. 6, 2016, and Taiwan application no. 105140556 filed on Dec. 8, 2016. The entirety of each of the above-mentioned patent applications is hereby incorporated by reference herein and made a part of this specification.

TECHNICAL FIELD

The disclosure relates to a catalyst composition for an alkaline electrochemical energy conversion reaction and a use thereof.

BACKGROUND

The hydrogen economy is a delivering energy system by using hydrogen. The hydrogen can function as an energy storage medium, and it is generated by renewable energy and then stored until a fuel cell converts it back to electricity, which be able to replace the current petroleum economic system. The renewable energy is, for instance, electrolysis of water by using solar power, wind power, tidal power hydro power, or geothermal power. The electrochemical energy conversion devices such as fuel cells, electrolysers, solar hydrogen generators, or electrochemical sensors have reached to commercialization stage, but high cost and limited amount Pt catalyst hinder the development in acidic media. To overcome this issue, the Pt free catalyst is alternative. However, the energy conversion efficiency of the Pt free catalyst is too low due to the slower kinetics thereof in alkaline media. Therefore, the enhancement of the electrochemical reaction rate of the Pt free catalyst becomes very important.

One of the key challenges of the development of fuel cells, electrolysers, solar hydrogen generators, and electrochemical sensors in alkaline media is an electrode reaction for hydrogen. The hydrogen oxidation reaction (HOR) and hydrogen evolution reaction (HER) have faster reaction kinetics in acidic media. However, the HOR and HER have slower reaction kinetics in alkaline media.

Therefore, the development of high activity catalyst for hydrogen oxidation reaction and hydrogen evolution reaction is a top priority for fuel cells, electrolysers, solar hydrogen generators, and electrochemical sensors in alkaline media.

SUMMARY

The catalyst composition for an alkaline electrochemical energy conversion reaction of the disclosure includes a support and at least one $Ru_xM_y$ alloy attached to the surface of the support, wherein M is a transition metal and X≥Y.

The method of electrochemical energy conversion of the disclosure is provided, in which an electrochemical energy conversion reaction is produced by using the catalyst composition in an alkaline media.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
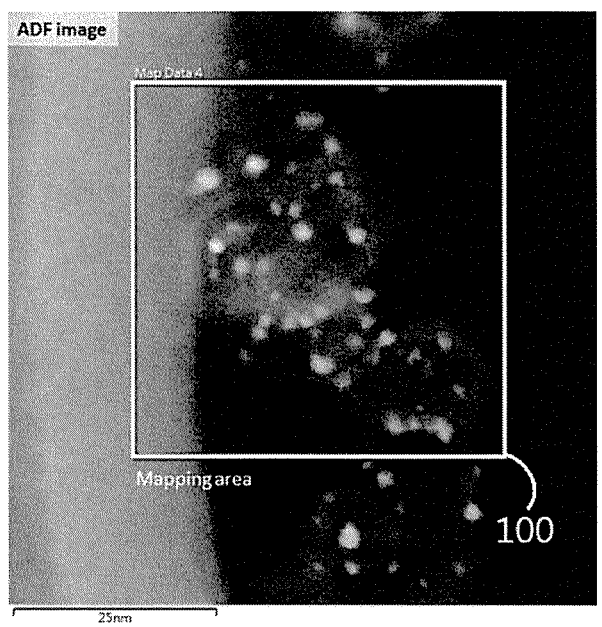
FIG. 1 is a TEM image of a catalyst composition containing a ruthenium (Ru)-nickel (Ni) alloy in a preparation example of the disclosure.

The disclosure relates to a catalyst composition for an alkaline electrochemical energy conversion reaction that can increase the efficiency of an electrochemical energy conversion reaction in an alkaline media. The catalyst composition of the disclosure includes a support and at least one $Ru_xM_y$ alloy attached to the surface of the support, wherein M is a transition metal and X≥Y.

The "alkaline electrochemical energy conversion reaction" of the disclosure refers to produce an electrochemical energy conversion reaction, such as a hydrogen oxidation reaction (HOR) or a hydrogen evolution reaction (HER), in an alkaline media.

In one embodiment of the disclosure, the X/Y in the $Ru_XM_Y$ alloy can be between 1 and 50, such as between 1 and 35. In one embodiment of the disclosure, the $Ru_XM_Y$ alloy can be 0.5 w % (weight percent) to 85 w % of the total mass of the catalyst composition, such as 10 w % to 40 w % of the total mass of the catalyst composition. In one embodiment of the disclosure, the M in the $Ru_XM_Y$ alloy can be nickel (Ni), cobalt (Co), iron (Fe), manganese (Mn), chromium (Cr), vanadium (V), titanium (Ti), copper (Cu), or zinc (Zn). Therefore, the $Ru_XM_Y$ alloy can include, for instance, a Ru—Ni, Ru—Co, Ru—Fe, Ru—Mn, Ru—Cr, Ru—V, Ru—Ti, Ru—Cu, or Ru—Zn alloy.

The support can be a conductive material or a corrosion-resistant material; for instance, the support includes a carbon material, metal oxide, or metal material.

The catalyst composition of the disclosure can be applied in an electrochemical energy conversion reaction containing, for instance, used in fuel cells, electrolysers, solar hydrogen productions, or electrochemical sensors. Therefore, the disclosure further provides a method of electrochemical energy conversion of the disclosure, in which an electrochemical energy conversion reaction is produced by the catalyst composition in alkaline media.

For instance, the electrochemical energy conversion reaction, such as a hydrogen oxidation reaction (HOR), is produced in the alkaline media. HOR: $H_2 + 2OH^- \rightarrow 2H_2O + 2e^-$. Alternatively, other electrochemical energy conversion reaction is a hydrogen evolution reaction (HER) in the alkaline media. HER: $2H_2O + 2e^- \rightarrow H_2 + 2OH^-$.

A number of experimental examples are provided below to demonstrate the efficacy of the disclosure, but the experimental examples are not intended to limit the scope of the disclosure.

Preparation of Catalyst Composition

The catalyst was prepared by using a modified Watanabe method. After a suitable amount of aqueous $NiCl_2$—$6H_2O$ solution was added in $H_2O_2$, the pH value was adjusted to 6 using 1 M NaOH to form solution A. A suitable amount of an aqueous $RuCl_3$—$3H_2O$ solution was used, and the solution pH value was adjusted to 4 with 0.6 M $Na_2CO_3$. Then, a suitable amount of $NaHSO_3$ was added, and the mixture was reacted at 80° C. for 30 minutes to form solution B. A suitable amount of carbon black ECP300 and solution B were mixed to form solution C. After solution C was dispersed by ultrasound for 30 minutes, solution A was added in solution C and the two were uniformly mixed, and then the solution pH was adjusted to 6 using 1M NaOH. After reflux and heating at 100° C. for 8 hours, the catalyst powder was separated by centrifuge and dried in an oven at 80° C. Lastly, the catalyst powder was reduced in a hydrogen environment (10% $H_2$/Ar) at 500° C. for 2 hours to obtain the catalyst composition containing the $Ru_XM_Y$ alloy.

The catalyst compositions of preparation examples 1 to 10 of Table 2 were made according to the preparation method above and the material weights in Table 1 below, wherein in the catalyst compositions of preparation examples 1 to 7, the $Ru_XM_Y$ alloy were 20 w % (weight percent) of the total mass of the catalyst composition, and in the catalyst compositions of preparation example 8, preparation example 9, and preparation example 10, the $Ru_XM_Y$ alloy were 10 w %, 30 w %, and 40 w % (weight percent) of the total mass of the catalyst composition.

TABLE 1

| | $NiCl_2$—$6H_2O$ (g) | $RuCl_3$—$3H_2O$ (g) | ECP300 (g) |
|---|---|---|---|
| Preparation example 1 | 0.0618 | 0.0227 | 0.096 |
| Preparation example 2 | 0.0357 | 0.0392 | 0.096 |
| Preparation example 3 | 0.0158 | 0.052 | 0.096 |
| Preparation example 4 | 0.0123 | 0.0542 | 0.096 |
| Preparation example 5 | 0.01 | 0.0556 | 0.096 |
| Preparation example 6 | 0.0085 | 0.0565 | 0.096 |
| Preparation example 7 | 0.0816 | 0.00996 | 0.096 |
| Preparation example 8 | 0.0123 | 0.0542 | 0.216 |
| Preparation example 9 | 0.0092 | 0.0406 | 0.042 |
| Preparation example 10 | 0.0246 | 0.1084 | 0.072 |

TABLE 2

| | Weight percent (w %) of $Ru_XM_Y$ alloy in total mass of catalyst composition |
|---|---|
| Preparation example 1 | 20 |
| Preparation example 2 | 20 |
| Preparation example 3 | 20 |
| Preparation example 4 | 20 |
| Preparation example 5 | 20 |
| Preparation example 6 | 20 |
| Preparation example 7 | 20 |
| Preparation example 8 | 10 |
| Preparation example 9 | 30 |
| Preparation example 10 | 40 |

Analysis

Figure 2A:
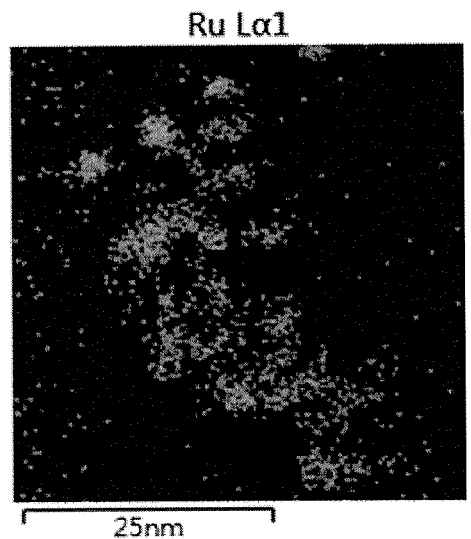
FIG. 2A is a Ru element distribution mapping of the catalyst composition for FIG. 1.
Figure 2B:
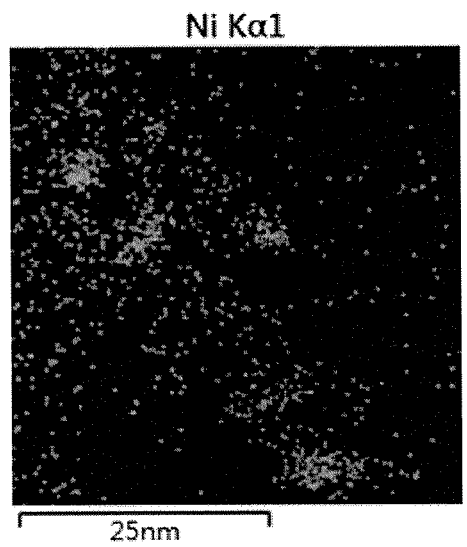
FIG. 2B is a Ni element distribution mapping of the catalyst composition for FIG. 1.

Elemental mapping analysis of electron energy loss spectroscopy (EELS) was performed on the catalyst composition containing a Ru—Ni alloy obtained in preparation example 4, wherein an analysis region 100 is as shown in FIG. 1. FIG. 2A and FIG. 2B respectively show the element distributions of Ru and Ni, wherein the bright region is the site in which a single element is present, and the dark region is the site of other elements. It can be seen from FIG. 1 that the analysis region contains a number of the catalyst composition, the same sites can be obtained by comparing the results of FIG. 2A and FIG. 2B, and Ru and Ni are both present, and therefore it can be determined that the Ru—Ni alloy is present on the surface of the support.

Figure 3:
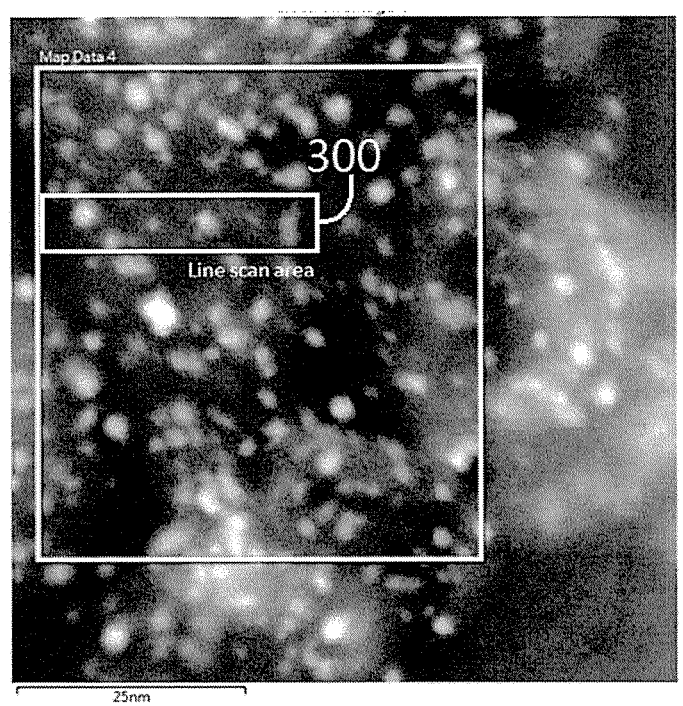
FIG. 3 is another TEM image of a catalyst composition containing a ruthenium (Ru)-nickel (Ni) alloy in a preparation example of the disclosure.
Figure 4:
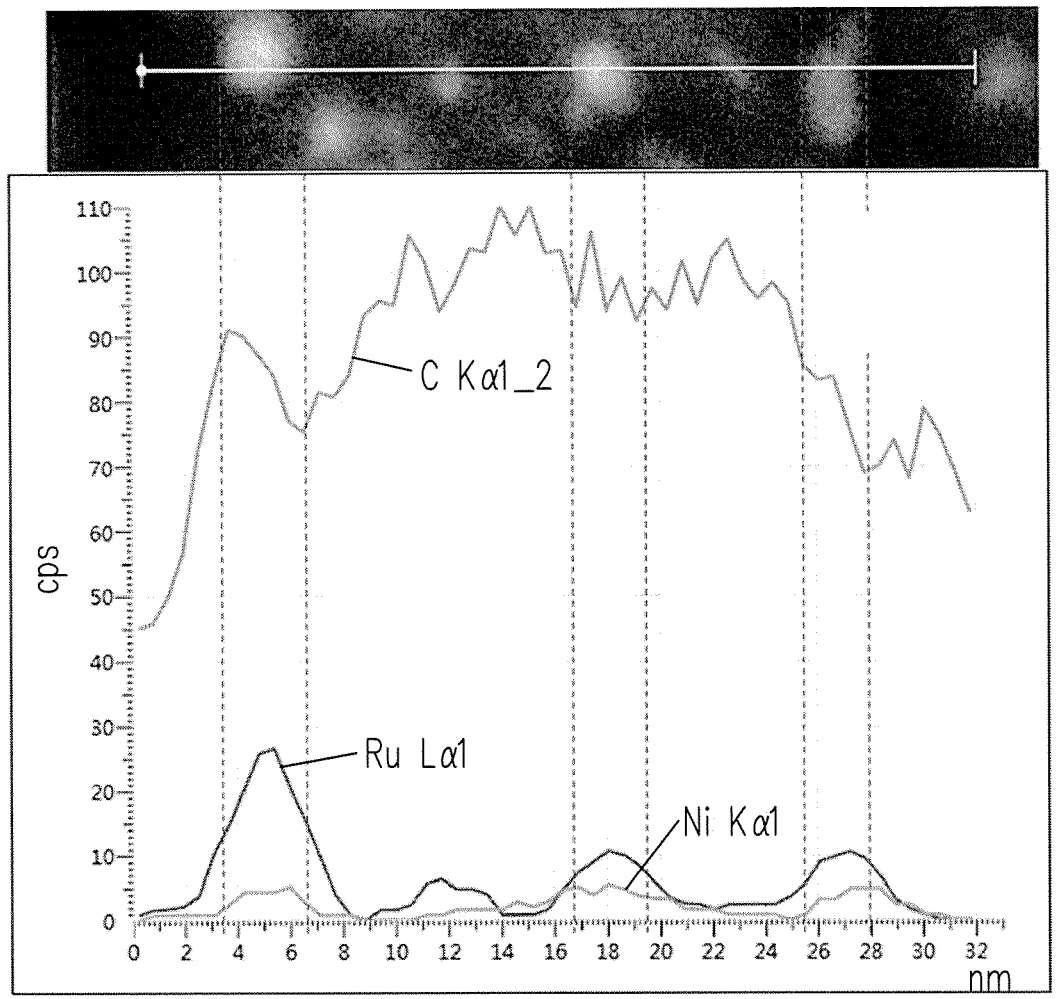
FIG. 4 is a line profile image of the catalyst composition for FIG. 3.

Moreover, the line profile image analysis was performed on the same catalyst composition, wherein an analysis region 300 is as shown in FIG. 3. FIG. 4 is a line profile image analysis diagram, and the bright region in the analysis region 300 in the top is the site of the Ru—Ni alloy. It can be learned from FIG. 4 that, the bright region in the analysis region 300 does contain both Ru and Ni elements, and therefore the component on the surface of the support is indeed a Ru—Ni alloy.

Moreover, X/Y of the $Ru_XM_Y$ alloy in the catalyst compositions of preparation examples 1 to 7 were analyzed by X-ray absorption spectroscopy (XAS), and the data is recorded in Table 3 below.

TABLE 3

| | X/Y (mole ratio) |
|---|---|
| Preparation example 1 | 1.6 |
| Preparation example 2 | 11.7 |
| Preparation example 3 | 19.5 |
| Preparation example 4 | 23.9 |
| Preparation example 5 | 29.8 |
| Preparation example 6 | 34.9 |
| Preparation example 7 | 0.1 |

Preparation of Catalyst Electrode for Testing

The 3.92 mg catalyst was stirred and dispersed by using a 1 mL solvent of water and PA, and then 10 microliters was taken and added dropwise on a glassy carbon (GC) substrate of the RDE. After vacuum drying, the following tests were performed.

Test

1. Hydrogen Oxidation Reaction (HOR) Test:

The catalytic activity of the catalyst electrode was tested by linear sweep voltammetry (LSV) with a rotating disk electrode (RDE). The catalyst electrode for testing was in 0.1 M KOH electrolyte solution at room temperature (about 27° C.). After hydrogen ($H_2$) was continuously introduced for 1 hour, the rotation speed of the RDE was kept at 1600 rpm, and the linear sweep voltammetry (LSV) scan conditions are as follows:

Scan rate: 10 mV/s;

Potential range: 0 to 0.2 V, versus the Reversible Hydrogen Electrode (RHE).

The evaluation performance method of Hydrogen oxidation reaction (HOR) was utilized to compare the current value of the same potential, wherein the greater positive value corresponds to a greater oxidation current, indicating the higher HOR activity.

2. Hydrogen Evolution Reaction (HER) Test:

The catalytic activity of the catalyst electrode was tested by linear sweep voltammetry (LSV) with a rotating disk electrode (RDE). A catalyst electrode for testing was in 0.1 M KOH electrolyte solution at room temperature (about 27° C.), the rotation speed of the RDE was kept at 1600 rpm, and the linear sweep voltammetry (LSV) scan conditions are as follows:

Scan rate: 10 mV/s;

Potential range: 0 to −0.4 V, versus the Reversible Hydrogen Electrode (RHE).

The evaluation performance method of Hydrogen evolution reaction (HER) was utilized to compare the current value of the same potential, wherein the greater negative value corresponds to a greater reduction current, indicating higher HER activity.

Experimental Example 1

Different Proportions for $Ru_XM_Y$ Alloys

Figure 5:
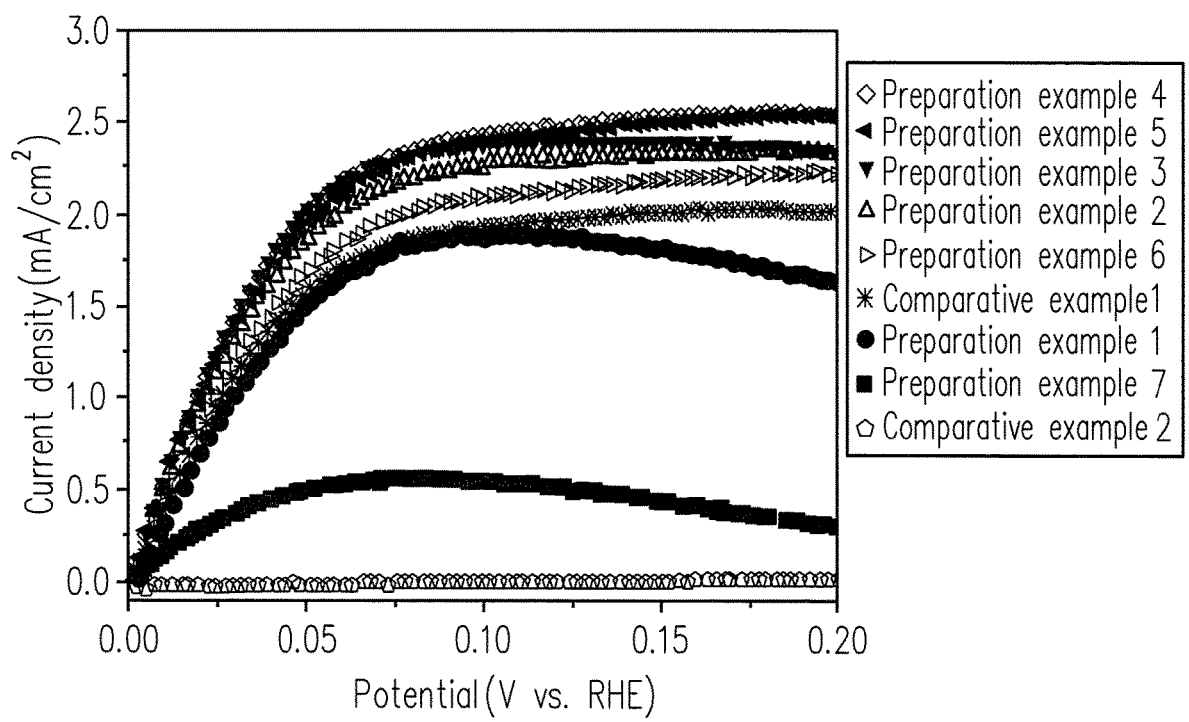
FIG. 5 is a diagram showing the relationship between oxidation current density and potential for comparative examples 1 to 2 and the Ru—Ni alloys of preparation examples 1 to 7.

FIG. 5 is a HOR test result for the catalyst composition of $Ru_XM_Y$ alloy in different X/Y mole ratio proportions in preparation examples 1 to 7.

Comparative Examples 1 to 2

Use of Pure Ru and Pure Ni

The HOR test results for 20 w % pure Ru and pure Ni catalyst compositions are shown in FIG. 5.

In a cell, there will be an electrode potential for the cathode, and an electrode potential for the anode. The difference in potentials between the two electrodes equals the cell potential, so the lower anode potential is desired. From FIG. 5, it is shown that the reactivities of Preparations 1 to 7 are both higher than that of pure Ni, and the reactivities of Preparative Examples 1 to 6 are also higher than that of pure Ru. Since Ni itself is extremely poor in reactivity, it is generally recognized that the addition of Ni to Ru may reduce the reactivity. However, it was confirmed by experiments that the alloying of Ru and Ni enhances the reactivity and is superior to the pure Ru of Comparative Example 1.

Experimental Example 2

Different Weight Percent for Catalyst Compositions

Figure 6:
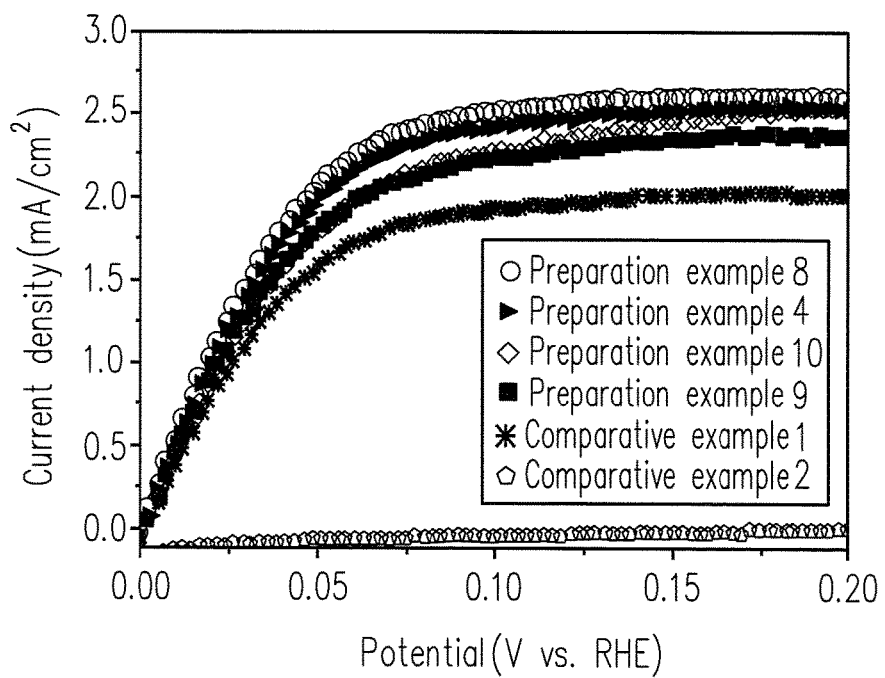
FIG. 6 is a diagram showing the relationship between oxidation current density and potential for comparative examples 1 to 2 and the Ru—Ni alloys of preparation examples 4 and 8 to 10.

The HOR test results with the preparations example 4 and 8 to 10, which is different weight percent for the $Ru_XM_Y$ alloy catalyst compositions, are shown in FIG. 6.

Moreover, the HOR comparison results of comparative Examples 1 to 2 are shown in FIG. 6.

FIG. 6 shows that the HOR reactivity of preparation examples 4 and 8 to 10 is significantly higher than that of Comparative Examples 1 to 2.

Comparative Example 3

Use of Commercial Pt Catalyst

Figure 7:
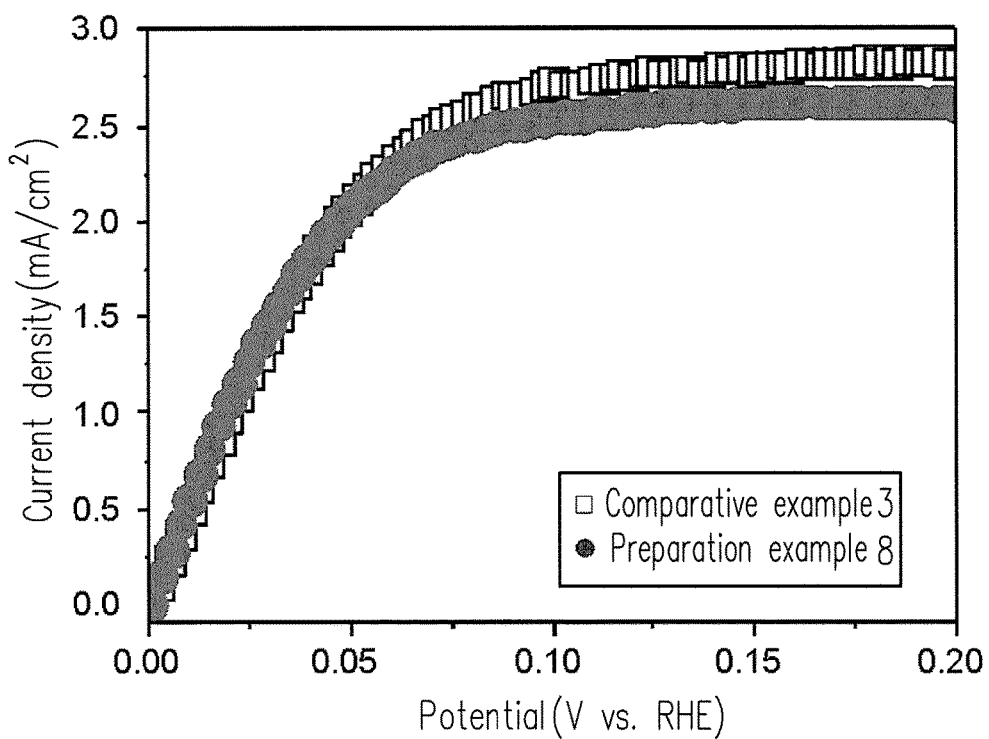
FIG. 7 is a diagram showing the relationship between oxidation current density and potential for comparative example 3 and the Ru—Ni alloy of preparation example 8.

The HOR test results for commercially JM Hispec 3000 Pt and preparation examples 8 are shown in FIG. 7.

It can be known from FIG. 7 that, the HOR reactivity of preparation example 8 is very close to the reactivity of comparative example 3, and the cost of the catalyst composition of preparation example 8 is much less than that of the Pt catalyst, indicating the catalyst composition containing the $Ru_XM_Y$ alloy has HOR application development potential.

Experimental Example 3

Different Proportions for $Ru_XM_Y$ Alloys

Figure 8:
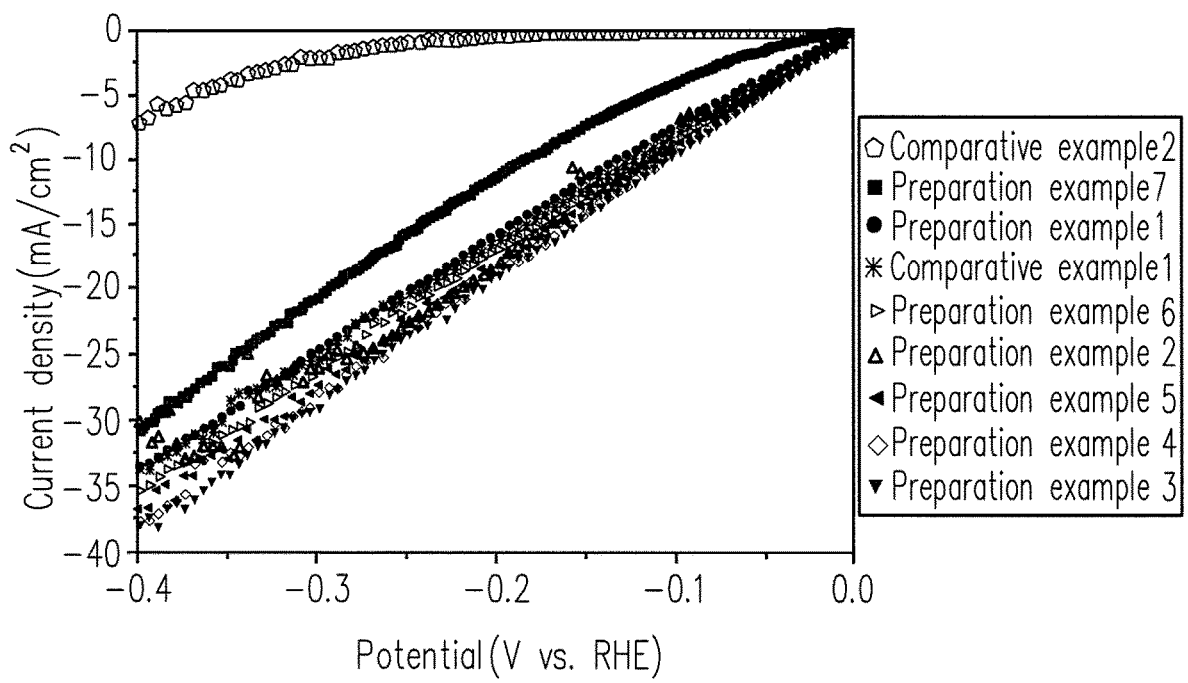
FIG. 8 is a diagram showing the relationship between HER current density and potential for comparative examples 1 to 2 and the Ru—Ni alloys of preparation examples 1 to 7.

FIG. 8 is a HER test result for the catalyst composition of $Ru_XM_Y$ alloy in different X/Y mole ratio proportions in preparation examples 1 to 7.

Comparative Examples 1 to 2

Use of Pure Ru and Pure Ni

The HER test results for 20 w % pure Ru and pure Ni catalyst compositions are shown in FIG. 8.

FIG. 8 shows that the HER reactivity of preparations 1 to 7 is higher than that of comparative example 2, and that of preparation examples 1 to 6 is higher than that of comparative example 1.

Experimental Example 4

Different Weight Percent for Catalyst Compositions

Figure 9:
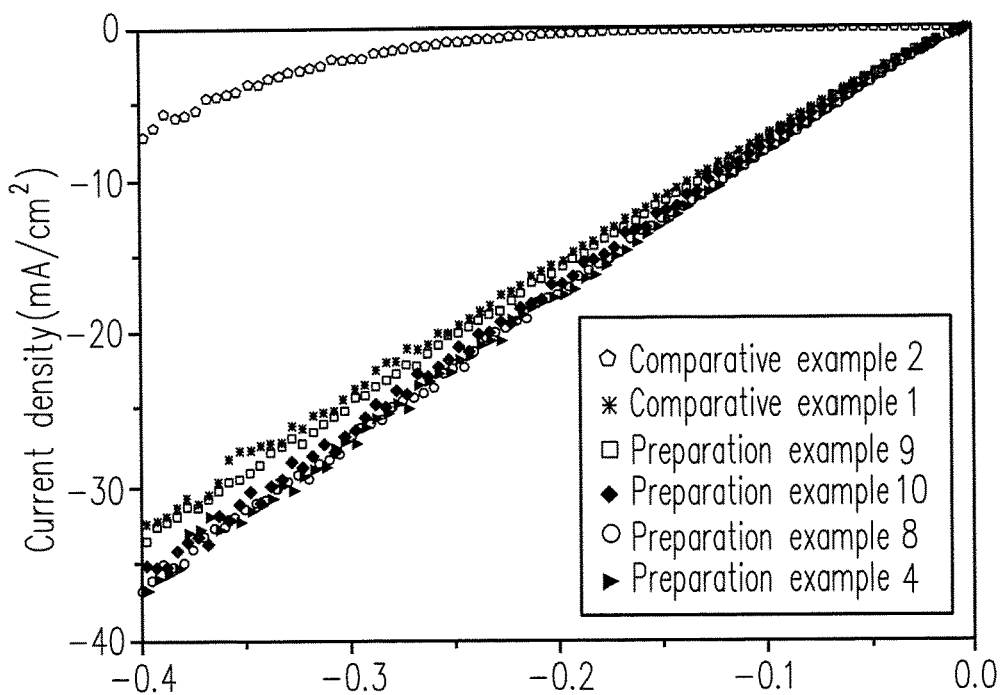
FIG. 9 is a diagram showing the relationship between HER current density and potential for comparative examples 1 to 2 and the Ru—Ni alloys of preparation examples 4 and 8 to 10.

The HER test results with the preparations example 4 and 8 to 10, which is different weight percent for the $Ru_XM_Y$ alloy catalyst compositions, are shown in FIG. 9. Moreover, the HER comparison results of comparative examples 1 to 2 are shown in FIG. 9.

FIG. 9 shows that the HER reactivity of preparation examples 4 and 8 to 10 is significantly higher than that of Comparative Examples 1 to 2.

Comparative Example 3

Use of Commercial PT Catalyst

Figure 10:
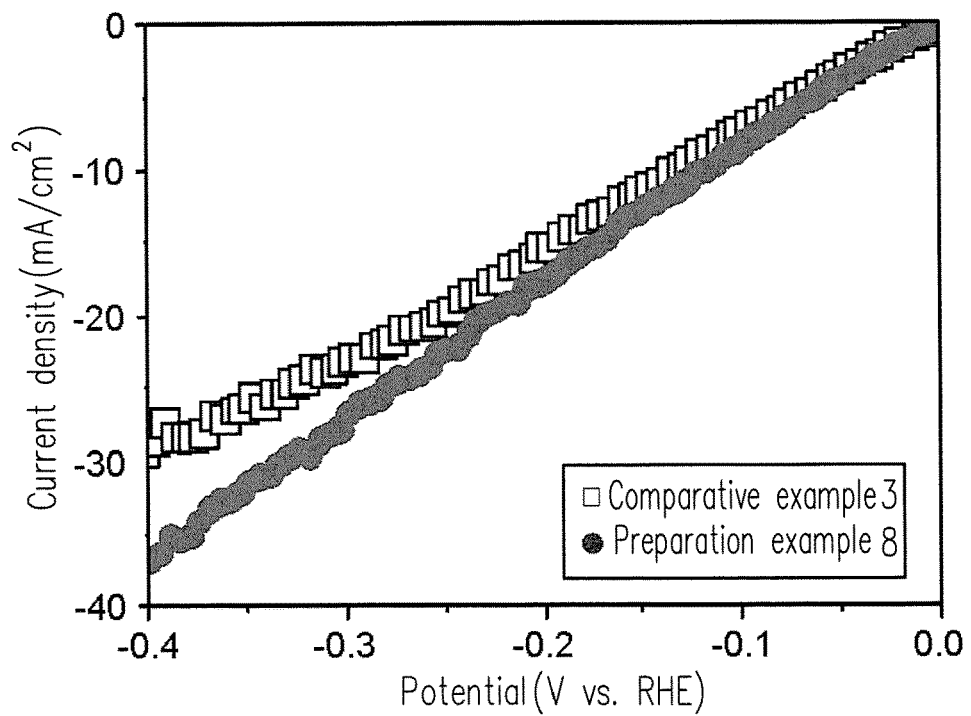
FIG. 10 is a diagram showing the relationship between HER current density and potential for comparative example 3 and the Ru—Ni alloy of preparation example 8.

The HER test results for commercially JM Hispec 3000 Pt and preparation examples 8 are shown in FIG. 10.

It can be known from FIG. 10 that, the HER reactivity of preparation example 8 is very close to the reactivity of comparative example 3, and the cost of the catalyst composition of preparation example 8 is much less than that of the Pt catalyst, indicating the catalyst composition containing the $Ru_XM_Y$ alloy has HER application development potential.

Although the $Ru_XM_Y$ alloys used in preparation examples 1 to 10 are Ru—Ni alloys, the disclosure is not limited thereto.

Figure 11:
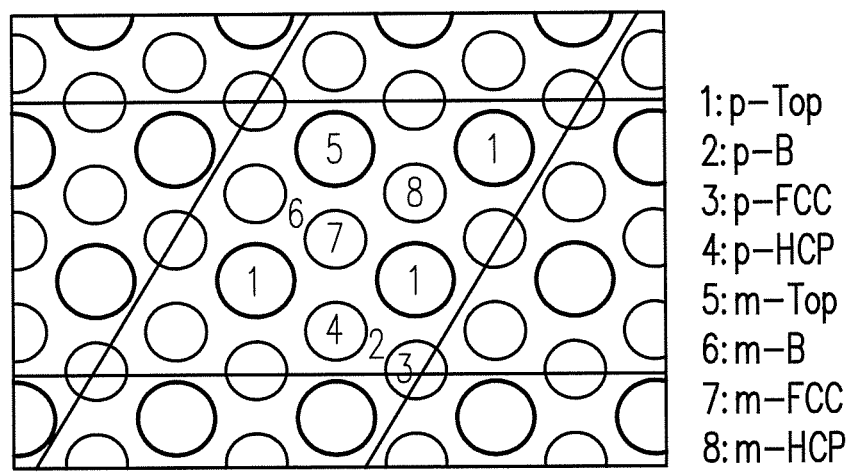
FIG. 11 is the crystal structure schematic diagram at different lattice sites of the $Ru_3M_1$ alloy surface.
Figure 12:
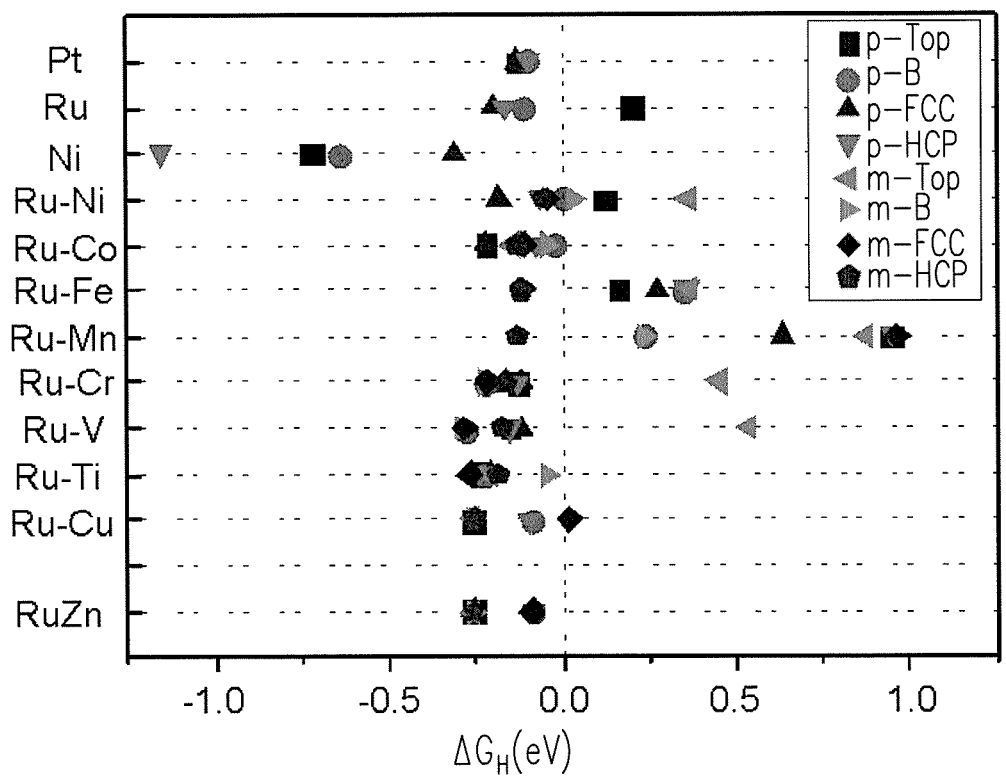
FIG. 12 is a simulation diagram of hydrogen atoms absorbing free energy ($\Delta G_H$) at different lattice sites with the $Ru_3M_1$ alloy surface for FIG. 11.

FIG. 11 is the crystal structure schematic diagram at different lattice sites for the $Ru_3M_1$ alloy surface. FIG. 12 is a simulation diagram of hydrogen atoms absorbing free energy ($\Delta G_H$) at different lattice sites with the $Ru_3M_1$ alloy surface for FIG. 11.

In FIG. 11, in the case of a pure metal (such as Pt, Ru, or Ni), all of the metal atoms in the lattice are the same, and therefore only the $\Delta G_H$ of the top site of the metal atoms and the surrounding sites thereof need to be considered, which are respectively the top site (p-top) of the metal atoms, the bridge site (p-B) between the metal atoms, the FCC hollow (p-FCC) of the metal atoms, and the HCP hollow (p-HCP) of the metal atoms. In the case of a $Ru_3M_1$ alloy, the metal atoms in the lattice are 3 Ru and 1 M, and therefore in addition to consider p-Top, p-B, p-FCC, and p-HCP of Ru, then the top site of M (m-top), the bridge site (m-B) between Ru and M, the FCC hollow of M (m-FCC) (i.e., the hollow in the middle of Ru—Ru-M), and the HCP hollow of M (m-HCP) (i.e., the hollow in the middle of Ru—Ru-M) also need to be considered.

The results based on the density functional theory (DFT) calculation of $\Delta G_H$ are shown in FIG. 12, and the adsorption free energy ($\Delta G_H$) of platinum is used for hydrogen atoms as a target to evaluate whether $Ru_XM_Y$ alloys can be used as potential HER and HOR catalysts. FIG. 12 shows that the $\Delta G_H$ of at least one lattice site in RuNi, RuCo, RuFe, RuMn, RuCr, RuV, RuTi, RuCu, and RuZn is less than zero, indicating M in the $Ru_XM_Y$ alloy can also be Ni, Co, Fe, Mn, Cr, V, Ti, Cu, or Zn. In comparison to pure Pt, the distribution range of $\Delta G_H$ thereof is similar, and therefore similar hydrogen adsorption energy and hydrogen desorption energy are obtained. Although $\Delta G_H$ of pure Ni is less than zero, the hydrogen adsorption energy of a too low $\Delta G_H$ is too high to desorb hydrogen.

Based on the above, the disclosure provides a catalyst composition formed by at least one $Ru_XM_Y$ alloy attached to the support that can be used in an alkaline electrochemical energy conversion reaction such as fuel cells, electrolysers, solar hydrogen productions, or electrochemical sensors and has high reactivity and reduced catalyst cost. As a result, the energy conversion efficiency of the electrochemical energy conversion reaction can be increased, and material costs can be significantly reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of electrochemical energy conversion, comprising: producing an electrochemical energy conversion reaction by using a catalyst composition in an alkaline media, wherein the catalyst composition comprises:
   a support and at least one $Ru_XM_Y$ alloy attached to a surface of the support, wherein M comprises nickel (Ni), cobalt (Co), iron (Fe), manganese (Mn), chromium (Cr), vanadium (V), titanium (Ti), copper (Cu), or zinc (Zn), and X≥Y,
   wherein the electrochemical energy conversion reaction is a hydrogen oxidation reaction or a hydrogen evolution reaction in an alkaline media, and the hydrogen evolution reaction is represented by $2H_2O+2e^- \rightarrow H_2 + 2OH^-$.

2. The method of electrochemical energy conversion of claim 1, wherein X/Y of the $Ru_XM_Y$ alloy is 1 to 50.

3. The method of electrochemical energy conversion of claim 1, wherein the $Ru_XM_Y$ alloy is 0.5 w % to 85 w % of a total mass of the catalyst composition.

4. The method of electrochemical energy conversion of claim 1, wherein the support is a conductive material or a corrosion-resistant material.

5. The method of electrochemical energy conversion of claim 1, wherein the support comprises a carbon material, metal oxide, or metal material.

* * * * *